United States Patent [19]

Fagan

[11] Patent Number: 4,971,028
[45] Date of Patent: Nov. 20, 1990

[54] SOLAR HEAT COLLECTOR AND INSULATION PANEL CONSTRUCTION

[76] Inventor: David M. Fagan, R.D. 1, Box 380A, Scio, N.Y. 14880

[21] Appl. No.: 238,832

[22] Filed: Aug. 31, 1988

[51] Int. Cl.⁵ .............................................. E04D 13/18
[52] U.S. Cl. .................................... 126/431; 126/422; 126/450
[58] Field of Search ............... 126/431, 429, 428, 419, 126/422, 449; 160/6, 370.2, 368.1, DIG. 13, DIG. 1, DIG. 2, DIG. 3; 52/202, 203

[56] References Cited

U.S. PATENT DOCUMENTS

| | | | |
|---|---|---|---|
| 2,232,303 | 2/1941 | Bailey | 160/DIG. 13 |
| 2,320,125 | 5/1943 | Goldmerstein | 160/368.1 |
| 3,990,635 | 11/1976 | Restle et al. | 126/429 |
| 4,043,317 | 8/1977 | Scharfman | 126/422 |
| 4,058,109 | 11/1977 | Gramm | 126/422 |
| 4,121,565 | 10/1978 | Grisbrook | 126/422 |
| 4,150,659 | 4/1979 | Buckley | 126/422 |
| 4,287,683 | 9/1981 | Louwenaar | 52/202 |
| 4,544,587 | 10/1985 | Nesbitt | 52/202 |

Primary Examiner—James C. Yeung
Attorney, Agent, or Firm—Stonebraker, Shepard & Stephens

[57] ABSTRACT

Several alternative forms of construction are disclosed, for enhancing build-up of solar-generated heat into a building or part thereof, while the sun is shining or the outside temperature is relatively hot, and for minimizing heat loss from the building when the sun is not shining or the outside temperature is lower. In the preferred form of disclosed construction, a member which is blackened for maximum heat absorption from the sun's rays changes its shape when it becomes heated, and acts as a valve, opening up for maximum inflow of solar heated air when the sun's rays fall on the blackened surface or it becomes heated from surrounding air, and closing when the temperature falls or the sun's rays no longer heat the blackened surface, so that flow of warm air to the outside or to a colder surface is halted, to minimize heat loss.

10 Claims, 8 Drawing Sheets

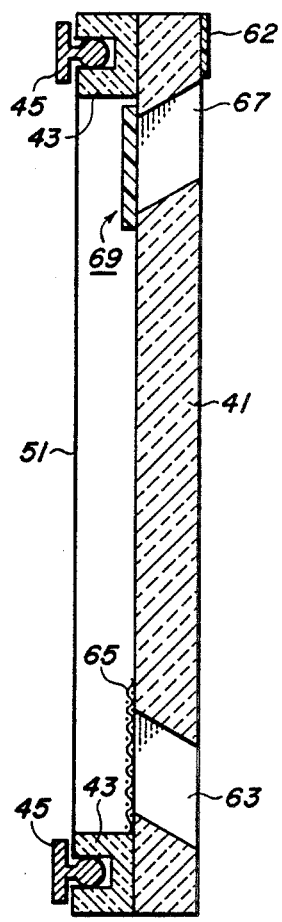
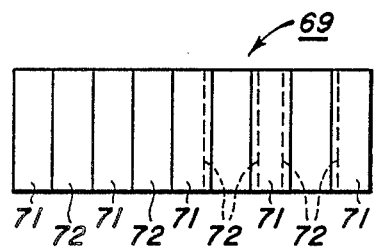
FIG. 4
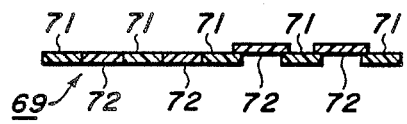
FIG. 5
FIG. 3

SOLAR HEAT COLLECTOR AND INSULATION PANEL CONSTRUCTION

BACKGROUND OF THE INVENTION

This invention relates to a panel construction which may be placed at a window of a building and which acts as an efficient collector of heat absorbed from the sun, to heat the building or at least to help in the heating thereof, and also acts as an insulating panel to impede loss of heat outwardly from the building through the panel when the sun's radiation is not sufficient to provide an inflow of heat.

SUMMARY OF THE INVENTION

Several embodiments of the invention are disclosed. In one form, a rectangular panel is provided, of a size to be placed on the inner face of one sash (either upper or lower) of a typical double hung sash window as commonly found in residences. This panel has a transparent outer wall (to be placed against the inner face of the existing window) and an inner wall spaced inwardly from it a short distance such as half an inch or three quarters of an inch. The outer face of the inner wall is black so as to absorb the maximum amount of heat from solar radiation. The inner or room face of this inner wall may be of any desired color or decoration. For circulation of air through the compartment between the transparent outer wall and the black inner wall, there is an inlet opening at the bottom of the inner wall, preferably screened, and an outlet opening at the top of the inner wall. This outlet opening is provided with a control valve or gate which comprises a series of narrow parallel strips of material, alternately transparent and blackened. Under relatively cold conditions, the strips are of the same length, and meet edge to edge, effectively closing the upper opening. But under warm conditions, influenced by receipt of solar radiation, the alternate blackened strips expand lengthwise, thereby causing them to buckle, while the intermediate transparent strips do not buckle. This buckling of the black strips opens spaces between the strips, allowing the warm air within the panel to escape into the room. But when insufficient solar radiation is received, the strips cool down and straighten out to close the exit opening, so that there is no further circulation of air through the panel, and thus the heat already in the building is not lost.

In another form of the invention, especially suitable in warmer climates where it may not be desired to use all of the available solar heat, there is provision for varying the area of the black absorbing surface on which the solar radiation may impinge. In one embodiment, this is done by having black absorbing surfaces on one face of each slat in a series of pivoted slats, while the other face of each slat is white or of relatively light color so as to reflect rather than absorb heat from the incoming solar rays. The series of slats are connected to each other to be turned in unison, and are turned so that the black faces of the slats face the incoming rays when maximum heat absorption is desired, and the white faces of the slats are turned toward the incoming rays when minimum heat absorption is desired, intermediate positions being available for absorption between maximum and minimum.

Another embodiment of the same general arrangement is to provide a permanent black absorbing surface with a series of narrow parallel slots, and mount a series of white sheets or vanes on a movable carrier or frame behind the black surface, with edges of the sheets projecting through the slots. When the white sheets are withdrawn so that they do not project to a substantial extent through the slots, they do not obscure a substantial part of the black surface, and almost the full area of the black surface receives and absorbs the incoming solar radiation. When a lesser amount of heat absorption is desired, the frame carrying the white sheets is shifted so that the sheets are projected to the desired amount through the slots in the black surface, and hang down in front of the black surface, obscuring it to the desired extent. When the white sheets are projected to the maximum extent, each sheet hangs down through its slot all the way to the top of the next lower slot, and the black surface is completely covered by the white sheets or vanes.

It is expected that in most cases gravity flow of air through the panel chamber will be sufficient, the cooler air from the room entering the chamber through the inlet opening at the bottom of the chamber and rising in the chamber as it is warmed, and exiting back into the room through the exit opening at the top of the chamber. However, the invention also includes the further feature, useful in some conditions, of providing baffles or barriers within the panel chamber to direct the flow of air back and forth from side to side as it rises, and also the feature of providing a small fan powered by a solar cell, to cause positive circulation of air through the chamber.

Another aspect of the invention deals with the details of construction of the panel, and the manner in which it is mounted against the window sash. Preferably the panel is of such simple construction that all or at least most of the parts for making the panel can be supplied to a potential user in the form of a kit containing a few simple basic parts and a set of directions which will enable a householder of reasonable intelligence to cut the parts to a size to fit his particular window, and assemble them quickly and easily in accordance with the directions, to make the complete window panel and attach it properly to his window sash. To this end, the invention includes the feature that the pieces which form the four sides of the rectangular panel structure are made of foamed plastic material which can be easily cut to shorter lengths if the window is smaller than the maximum size for which the kit is designed.

Grooves running along the outer face of the top, bottom, and side pieces or rails receive magnetic strips with a tight press fit, which serve to hold a transparent sheet in place. The magnetic strips also mate with magnetic strips fastened to the existing window, to hold the entire panel assembly detachably in place on the existing sash.

In another embodiment of the invention, a gate plate with a blackened heat-absorbing outer surface is fixed about midway of its height to the lateral edges of an outer wall opening, which may be glazed or unglazed. Sun shining on the blackened surface heats this surface and causes the gate plate to curl so that the top and bottom edges move inwardly away from the top and bottom edges of the opening, to provide passages for circulation of warm air. When the sun is not shining, the plate straightens to a plane and closes the gaps or circulation openings at its top and bottom edges.

In other embodiments of the invention, blackened vanes or small plates are mounted movably with respect to companion white vanes, the position being movable to determine the relative amounts of white area and black area exposed to the sunlight, thereby controlling the amount of heat which will be reflected or absorbed.

Still other embodiments are described, including a baffle arrangement for promoting sinuous flow of air, and a fan arrangement for promoting flow of air.

BRIEF DESCRIPTION OF THE DRAWINGS

FIG. 3 is a schematic vertical section through the same;

FIG. 4 is a face view of a heat responsive gate or valve constituting part of the unit;

FIG. 5 is a horizontal section taken approximately on the line 5—5 of FIG. 4;

DESCRIPTION OF THE PREFERRED EMBODIMENTS

Referring first to FIGS. 1-5, there is here shown the simple or basic form of the solar heat collector and insulating panel unit. It is intended to be mounted detachably on the inner face of an ordinary window, such as the conventional double hung vertically sliding window sash customarily found in residences, and also in many office buildings.

Figure 1:
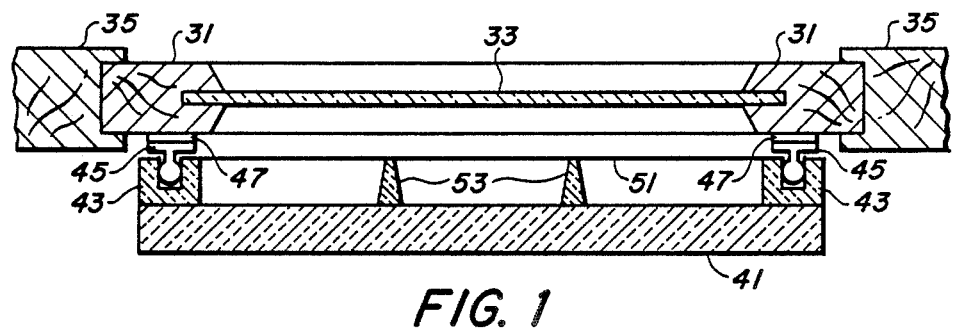
FIG. 1 is a horizontal section through one embodiment of solar heat collector and insulation panel according to the invention, with the unit applied to a window sash.
Figure 2:
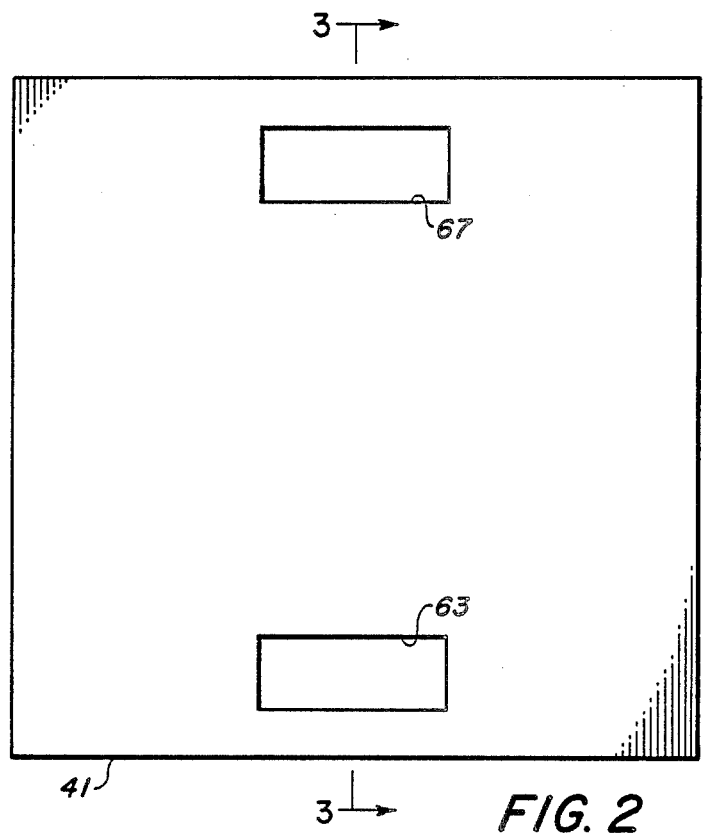
FIG. 2 is an elevational view of the same, showing the inner or room face thereof.

The window itself is shown somewhat schematically in FIG. 1, where the usual wooden rails of the window are indicated at 31, and the glass pane at 33. The window slides up and down in guideways in the window frame shown schematically at 35.

The main body of the unit of the present invention comprises a rectangular panel 41 of dimensions to cover substantially the entire area of the window, extending as illustrated in FIG. 1) from one window side rail 31 to the other side rail 31, and from the top cross rail to the bottom cross rail of the window. Around the margins of this panel there is a flange 43 extending forwardly toward the window, and at the front edge of this flange there are magnetic members 45 (either metallic or ceramic) which engage with and are magnetically held to magnetic strips 47 (metallic or ceramic) firmly affixed to the window rails.

Stretched tightly across the area of the panel 41 but supported by the flanges 43 so as to be spaced from the face of the panel, is a thin transparent membrane 51. It may be called a glazing member, so far as the unit of the present invention is concerned, but must not be confused with the glass pane or glazing member of the regular window, shown at 33. Spacers 53 are affixed at intervals to the face of the panel 41, to engage the glazing membrane 51 and hold it in spaced relation to the panel, in case the membrane may tend to sag toward the panel.

The panel 41 is made of some light material which has high heat insulating value, i.e., relatively low coefficient of transmission of heat. A good material for this is foamed low density urethane, but other materials may be used. The flanges or rails 43 are preferably of the same material and the same thickness (e.g., ¾ inch) as the panel 41. A convenient and satisfactory material is the panel material available in the building materials supply market under the trademark "Thermax," which is a low density foamed urethane panel reinforced with fiber glass and having aluminum foil permanently bonded to both faces of the panel. To blacken the front face of the panel for efficient heat absorption, it may be painted with any suitable black paint, for example with a noncombustible acrylic latex flat black paint applied directly to the panel surface (i.e., to the aluminum foil coating on the panel, if such foil is present) or applied over a prime coat which has first been applied to the panel if deemed necessary.

The inner or room face of the panel 41 may be decorated in any desired manner. This may be done by applying paint or other decorative substance directly to this face of the panel, or by applying a pre-decorated sheet of paper, fabric, plastic sheeting, etc., to the face of the panel. A fragment of such a decorated sheet is indicated schematically at 62 in FIG. 3.

An air inlet opening 63 is formed through the panel 41 near the bottom thereof. This opening may go straight through the thickness of the panel, but preferably it is formed obliquely at an upwardly extending angle, as illustrated in FIG. 3, to enhance the flow of air inwardly through the inlet opening 63 and thence upwardly in the compartment or chamber formed between the panel 41 and the glazing 51. The inner end of the opening 63 is preferably covered by a screen 65. The upward slanting of the inlet opening 63 serves the further purpose that from most locations within the room, a person looking toward the panel would not see the screen or much of it, but would see the lower inclined edge of the opening 63, which inclined edge may be colored to harmonize with the rest of the panel.

Near the top of the chamber or compartment, an exit opening 67 is formed through the thickness of the panel 41. Like the inlet opening 63, it may be formed straight through the thickness of the panel, but preferably is inclined as illustrated in FIG. 3, the inclination being in the opposite direction, so as to enhance rather than impede the flow of air coming into the compartment through the inlet opening 63 and exiting into the room through the outlet opening 67.

At the inner end of the exit passageway 67 there is a control gate or valve designated in general at 69, for controlling the flow of air. In the preferred form here illustrated, this gate or valve is made of a series of alternating transparent and blackened strips 71 and 72, respectively, as shown in FIGS. 4 and 5. These are made of some suitable flexible sheeting such as "Cellophane," the strips 71 being left clear, and the alternating strips 72 being blackened by applying black paint or the like. The alternate strips may, if desired, all lie in the same plane, with their lateral edges tightly abutting each other, as shown in the left hand portions of FIGS. 4 and 5. Alternatively, alternate strips may slightly overlap each other at their lateral edges, as shown in the right hand portions of FIGS. 4 and 5. In either case, the top and bottom ends of the strips 71 and 72 are firmly fastened (e.g. adhesively, or by staples) in fixed position on a suitable support such as on the inner face of the panel 41.

Under cool conditions (as at night, or when the sun is obscured by clouds) the valve members 71, 72 are in the closed position indicated in FIGS. 4 and 5. The valve 69 is closed or almost closed, and there is little or no circulation of air through the panel chamber, so there is little loss of heat already within the building, that is, little transfer of heat from the building through the panel chamber to the main window glazing 33 and through the glazing to the outside atmosphere. But when the sun shines on the panel, the black strips 72 of the valve assembly absorb appreciably more heat than the transparent strips 71, and therefore expand appreciably more in a longitudinal direction between their fixed ends, so that they buckle, while the transparent strips 71 remain straight or more nearly straight between their fixed ends. The buckling of the black strips 72 thus opens up passages between the alternate strips 71 and 72 which collectively form the valve 69, so that air can now flow in through the inlet opening 63, upwardly through the panel chamber between the panel 41 and the membrane 51 (or between the panel 41 and the main glazine 33 if no membrane is used), and out through the outlet opening 67. Thus the air heated by the sun during the day is constantly delivered into the building to warm it, but the circulation is automatically stopped at night to reduce the heat loss.

Figure 6:
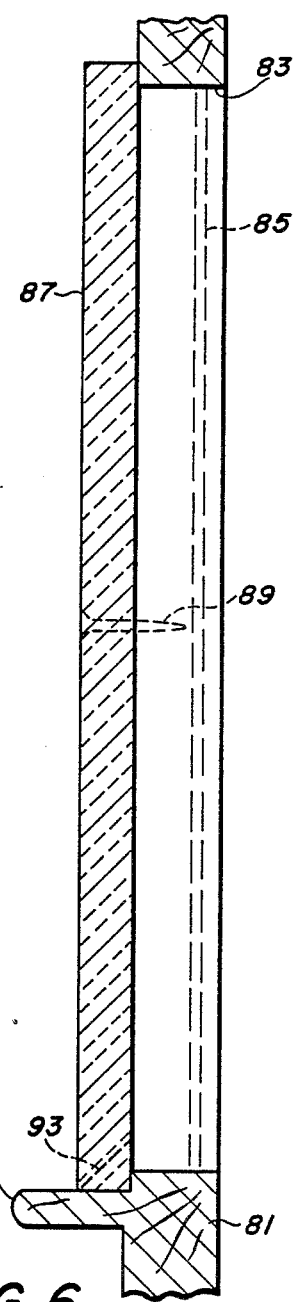
FIG. 6 is a schematic vertical section through another embodiment of the invention, with a gate plate closed.
Figure 7:
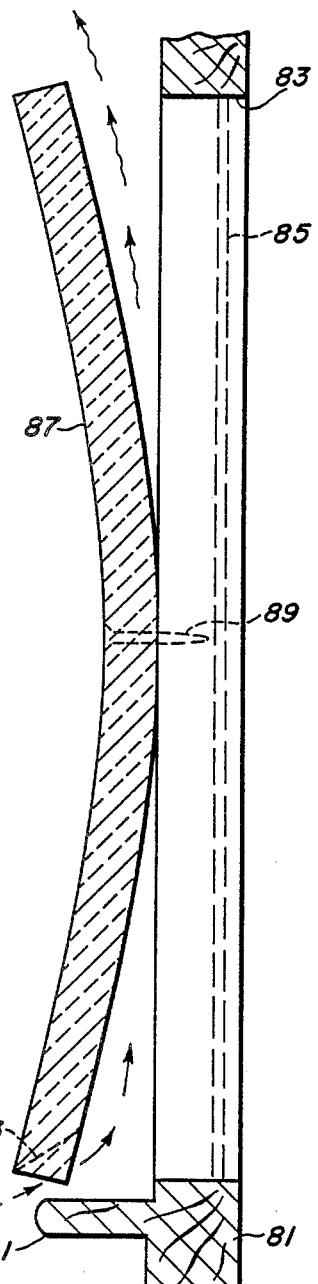
FIG. 7 is a similar view with the plate in open position.

Another embodiment of the invention, operating on similar principles, is illustrated in FIGS. 6 and 7. Here, there is a building wall 81 having an opening 83 which may be either glazed or unglazed. The broken lines 85 indicate optional glazing which, if present, may be either permanent or movable, as in sliding sash or a completely removable window pane. The details of the glazing, if any, are not important for purposes of the present invention.

There is a panel member 87, which may be called a gate member or gate plate, positioned across the opening 83 on the inside (the room side) thereof, with the edges of the panel slightly overlapping the building wall or an appropriate casing or moulding surrounding the opening, so that in the normal cold position shown in FIG. 6, the panel 87 substantially completely closes the opening 83. The panel 87 is made of a material which will curve appreciably when one surface becomes hotter than the opposite surface, the hotter surface becoming convex and the cooler surface becoming concave, and which will straighten out again to plane form when both surfaces are at approximately equal temperature. Such a material which is satisfactory for purposes of this invention is the "Thermax" material already mentioned above in connection with a previous embodiment, with aluminum foil facing on both surfaces, and with the outer face (toward the outside of the building) painted black or otherwise made black in the manner described above, for maximum absorption of heat when the sun's rays shine upon it.

Approximately midway of one dimension of the plate 87 (that is, midway vertically along the side edges, or midway horizontally along the top and bottom edges) the edges of the plate are fixed firmly to the building structure (the building wall or a casing or moulding surrounding the opening) by any suitable attaching means indicated schematically at 89. This attaching means may be screws, or nails, or magnets, or snaps or clips mounted on the building structure and engageable over the edges of the panel member, or adhesive, or any other form of fastener, the details of which are unimportant for purposes of the present invention.

When the warmth of the sun, absorbed by the blackened outer face of the panel or gate member 87, warms the outer portion of the thickness of the panel as compared with the cooler inner postion of such thickness, then the panel will curve toward the shape shown in FIG. 7, convex on the outside and concave on the inside or room side. This will open up passageways for flow or circulation of air at top and bottom of the panel, as shown by the arrows in FIG. 7, if the panel has been mounted to the wall along its vertical side edges. If it has been fixed to the wall at points on its top and bottom edges rather than the side edges, then the curvature will open up air passages at the sides of the panel rather than at top and bottom. If there is no glazing or window pane 85 present in the building opening 83 (as in those climates where it is warm during the day but cool at night) these air passages produced by the curving of the gate member 87 will permit circulation of the warm outside air into the building, but during the cooler night the panel will straighten out to its planar shape and close the openings to prevent entrance of cold air from outside into the building and escape of warm air from the building to the outside. In cooler climates where glazing 85 is present in the building opening 83, the passages opened by the curvature of the panel or gate member will permit the air within the building to circulate through the chamber between the panel 87 and the glazing 85, coming in at the bottom, picking up heat from the sun's radiation coming through the glazing 85 as the warming air passes upwardly in this chamber, and exiting back into the room from the top of the chamber. But when there is no sufficient warmth from the sun's radiation, the gate member 87 will resume its planar form, closing the air passages, and preventing circulation of air past the glazing 85, so there is no heat loss from circulating warmer air within the building against the colder glazing 85.

If the opening 83 happens to have a window sill or projecting moulding at its lower edge, as shown at 91, it is preferable to bevel the lower edge of the panel 87, as shown at 93, through most of the length of the lower edge of the panel, preferably leaving the corners intact and not beveled. This bevelling of the lower edge helps to open up an air inlet opening more quickly when the panel first begins to curve under the influence of heat, if a window sill or the like is present. The bevel is unnecessary if there is no sill or ledge close to the bottom edge of the panel.

Figures 8, 9:
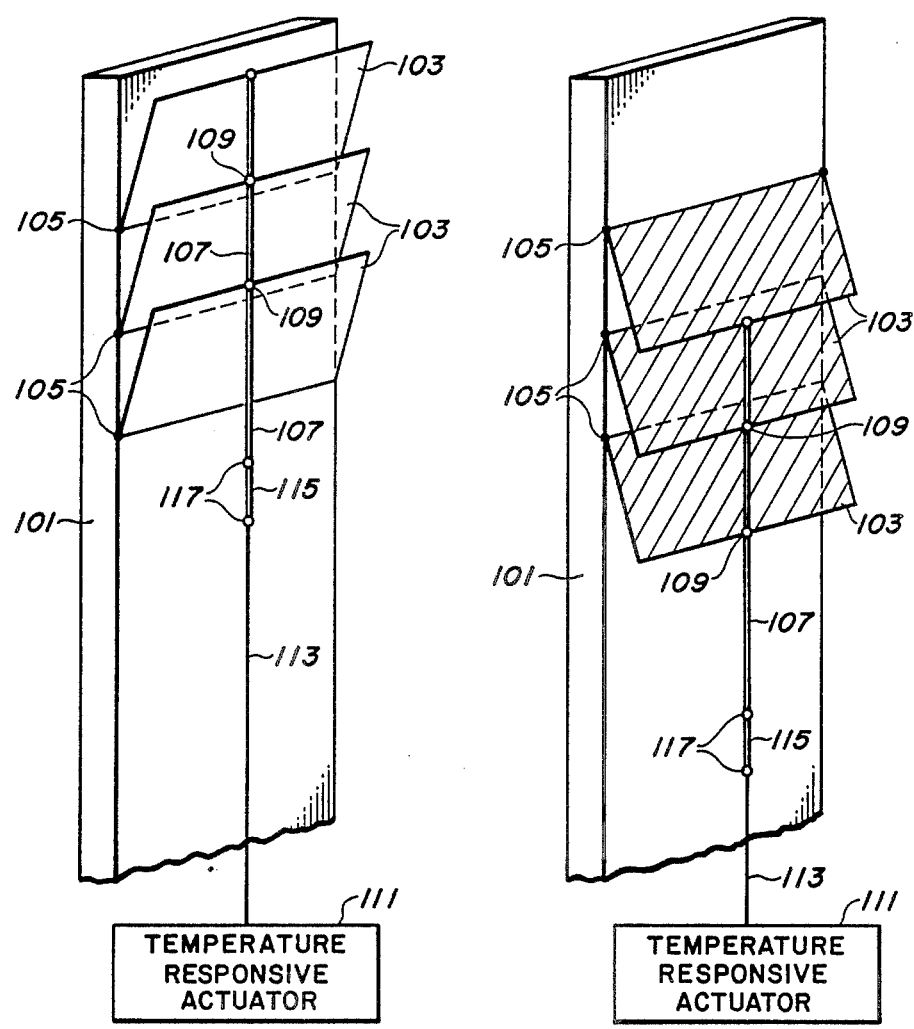
FIG. 8 is a schematic view of another embodiment of the invention, with pivoted vanes in heat-reflecting position.
FIG. 9 is a similar view with the vanes in heat-absorbing position.

Another aspect of the invention involves adjusting the amount of heat received from the sun, the adjustment preferably being made automatically in response to the temperature existing at a predetermined control point. This is illustrated in FIGS. 8 and 9, to which reference is now made.

On any suitable conventional support 101, such as a panel or frame, a series of vanes or blades 103 is mounted to swing on respective pivots or hinges 105 so that either face or surface of each vane may be exposed. The pivots or hinges 105 may extend either horizontally, as here illustrated, or vertically, or in any inclined direction if for some reason an inclination is preferred. One face of each vane is white or light colored, for maximum reflection of heat from incoming rays of the sun, and the opposite face of each vane is black or dark colored, for maximum absorption of heat from incoming sun rays. It does not matter which side is which. In the illustration, the white sides of the vanes are faced outwardly when they are swung to their upper positions shown in FIG. 8, and the black sides are faced outwardly when the vanes are swung to their lower positions seen in FIG. 9. The diagonal shade lines in FIG. 9 are intended to indicate the black color. The vanes in each set or assemblage may be of any desired dimensions and of any desired number, three being here shown merely as an illustrative example.

The free edges of the respective vanes are coupled to each other by the connecting rod or operating member 107 which is pivotally connected to the free edge of each vane as indicated schematically at 109, so that all of the vanes swing in unison from one position to the other. This swinging may be done manually, but preferably is accomplished automatically by a temperature responsive actuator 111 of any conventional kind, the details of which are not important for purposes of the present invention. The temperature responsive actuator may be, for instance, a small electric motor controlled by a thermostat, or a bi-metallic heat responsive element designed to have a relatively large swing of sufficient range to move the vanes from one position to the other, or any other known form of actuator responsive to temperature. Whatever its form, the actuator is operatively connected to the vane control rod 107 by appropriate connections 113, 115 which may be pivoted or articulated at appropriate points 117 to allow for the outward swinging of the rod 107 as the vanes move from one position to the other. The vanes or movable blades are made of some light but rigid material, such as sheet aluminum, so that they do not require much power to swing them up from the down position of FIG. 9 to the up position of FIG. 8, and even less power is required if the pivots of the blades extend vertically rather than horizontally.

In use, an assemblage of these pivoted vanes or blades is placed wherever desired, usually just inside a window exposed to sunlight. The heat responsive actuator is set or adjusted for the desired temperature in the room. When the temperature is less than the set temperature, the blades will be in the black-exposed position, absorbing maximum heat from the incoming rays of the sun. Convection currents will transfer the absorbed heat from the blades to the surrounding air in the room. When the room heat reaches the pre-set temperature, the actuator 111 will shift the blades 103 to their other positions, with their white sides exposed, to reflect more heat and absorb less heat. If the room cools down below the set temperature, the actuator will shift the vanes again, to expose the black sides, and more heat will be absorbed.

Figure 10:
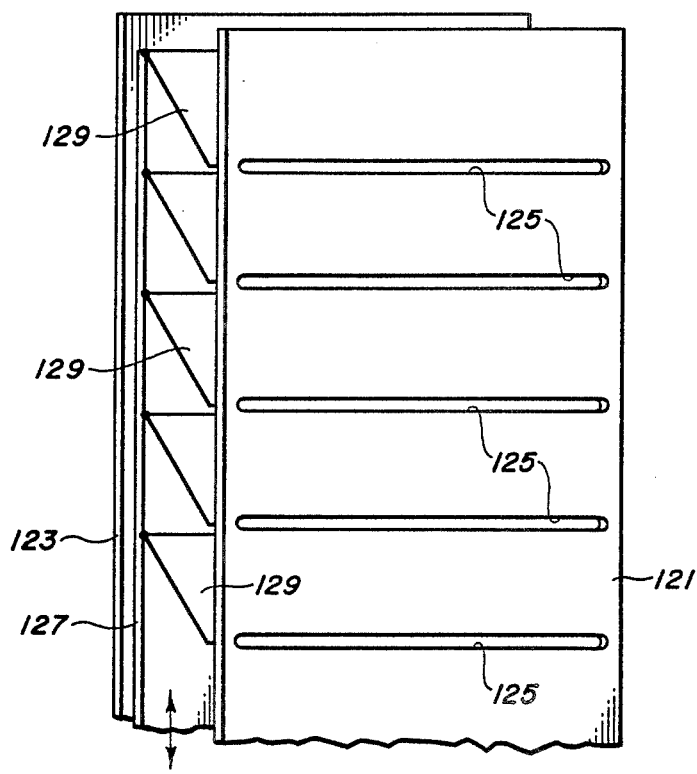
FIG. 10 is a schematic view of another embodiment of the invention, with heat reflecting vanes withdrawn to expose a maximum heat-absorbing black area.
Figure 11:
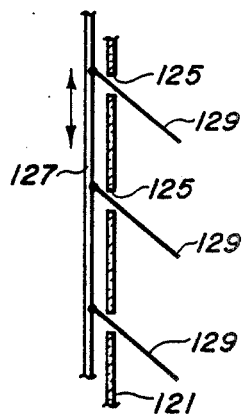
FIG. 11 is a similar view with the heat-reflecting vanes projected to cover the heat-absorbing area.

Another embodiment of the invention is illustrated in FIGS. 10 and 11. A hollow housing or casing has a front wall 121 and a rear wall 123. The front wall has a series of parallel slots 125. In the space between the walls 121 and 123 is a rigid carrier 127, movable in a direction at right angles to the slots 125. That is, if the slots are horizontal, the carrier moves up and down vertically. The carrier may be a continuous rigid panel, or may be a skeleton framework. In either case, vanes or blades 129 are pivotally mounted on the carrier 127 and are of such dimensions that they may extend through the respective slots, one blade through each slot. In FIG. 10, the blades are not seen extending through the slots, for the sake of better showing of the slots themselves, but in FIG. 11 the blades or vanes are shown in working position, projecting through the slots.

The front surface of the front wall 121, and the front faces of the blades, are of contrasting color, light and dark. If the front surface of the wall 121 is black, the blades are white, or if the wall 121 is white, the blades 129 are black. As the carrier 127 moves upwardly and downwardly, the blades will be projected through the slots to different extents, covering different proportions of the front area of the wall 121. When the carrier 127 is at its upward limit of motion, the blades will just barely project through the slots, just enough to maintain contact, and will not cover any appreciable part of the area of the wall 121, so that if the wall is black, it will absorb maximum heat from incoming rays of the sun, when this structure is placed, e.g., just inside a window on a sunny side of the building. If the carrier 127 is moved downwardly, the white blades 129 will project farther through the slots 125, and will hang down over the black coating on the wall 121 to an increasing extent, until the carrier reaches the downward limit of its movement, at which time the white blades will completely cover the black wall surface, for maximum reflection of heat rather than absorption. The carrier 127 is moved upwardly and downwardly by the same means mentioned above for moving the blades 103 in the embodiment shown in FIGS. 8 and 9.

Figure 12:
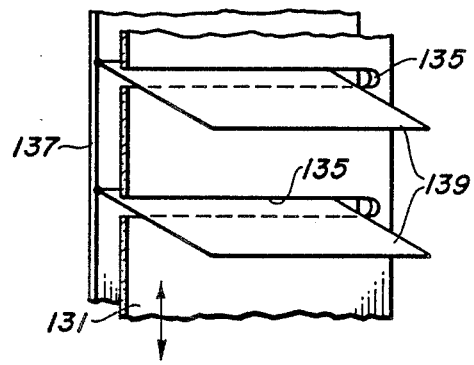
FIG. 12 is a schematic view of a modification of the structure illustrated in FIGS. 10 and 11.

FIG. 12 shows an embodiment operating on the same principles as in FIGS. 10 and 11, differing only in a reversal of the movable parts. Here, the wall 131 (for example, black) has slots 135, and the carrier 137 carries the pivoted vanes or blades 139 (for example, white) which project through the slots, as before. But here it is the carrier 137 which is stationary, and the wall 131 moves upwardly and downwardly. The operation is otherwise the same as in FIGS. 10 and 11.

Figure 13:
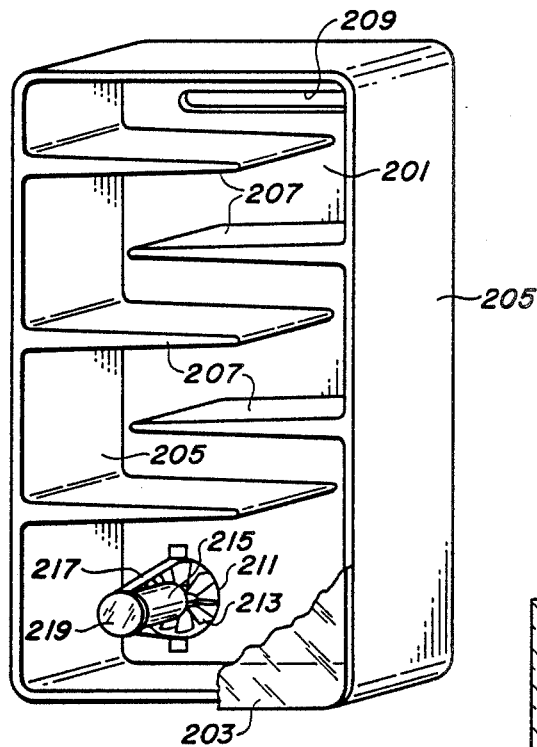
FIG. 13 is a face view of an arrangement of fan and baffles for promoting sinuous flow of air.
Figure 14:
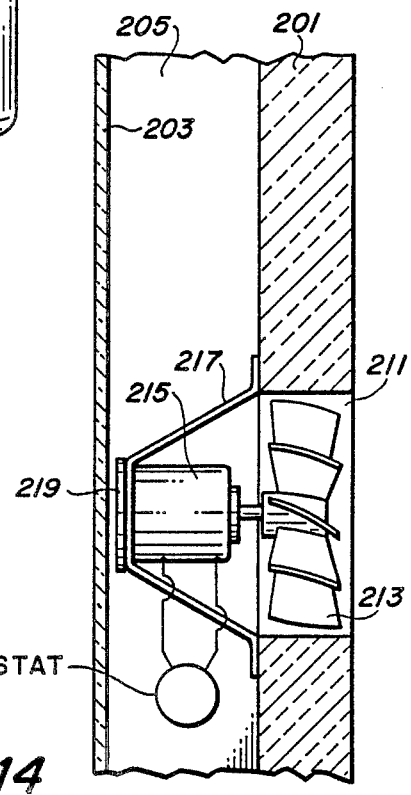
FIG. 14 is a schematic side view of a fan and solar cell arrangement according to the invention.
Figure 15:
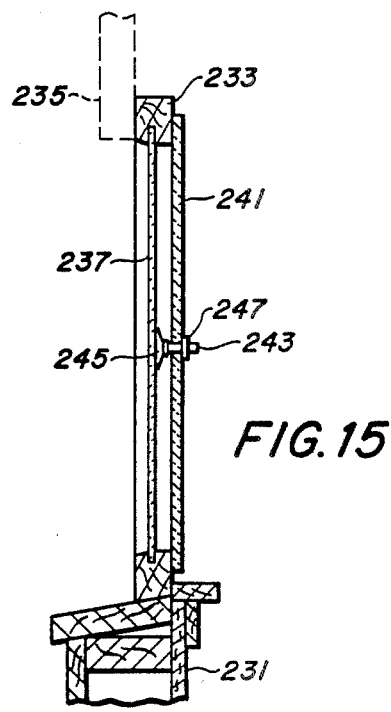
FIG. 15 is a schematic vertical section illustrating another embodiment of the invention, with the solar-responsive gate plate in cold or closed position.
Figure 16:
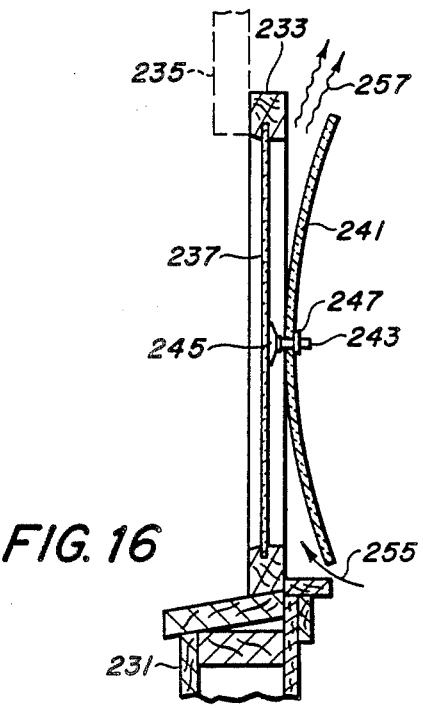
FIG. 16 is a similar view with the solar-responsive gate plate in warm or open position.
Figure 17:
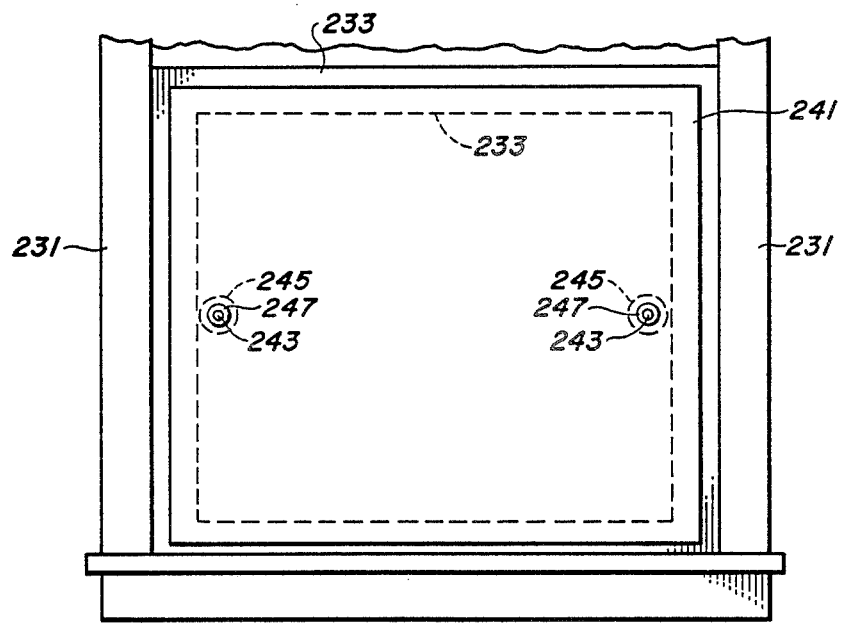
FIG. 17 is a face view or elevational view of the structure shown in FIG. 15.
Figure 18:
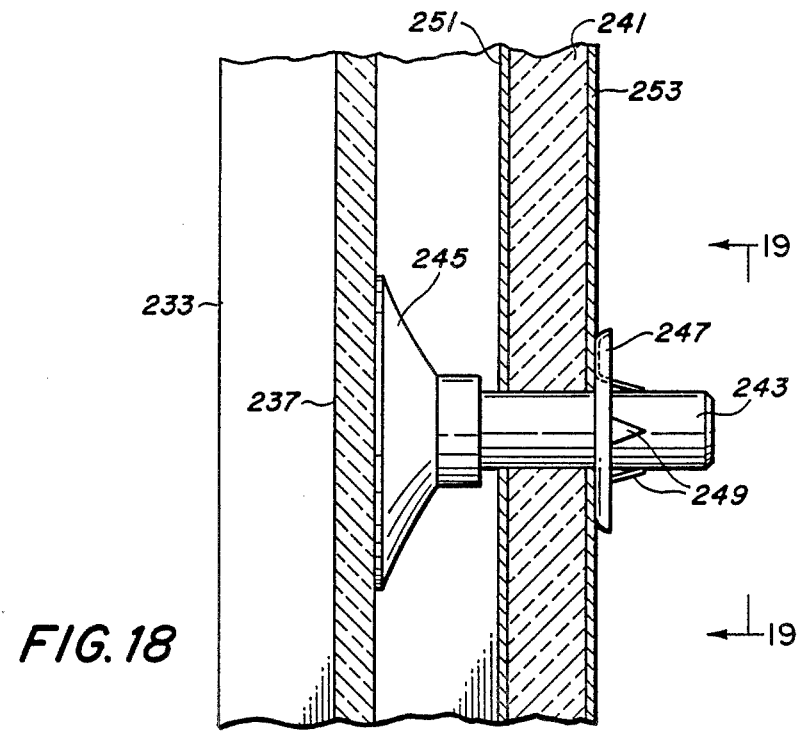
FIG. 18 is a detail vertical section through a suction cup holding device forming part of the structure shown in FIGS. 15-17.
Figure 19:
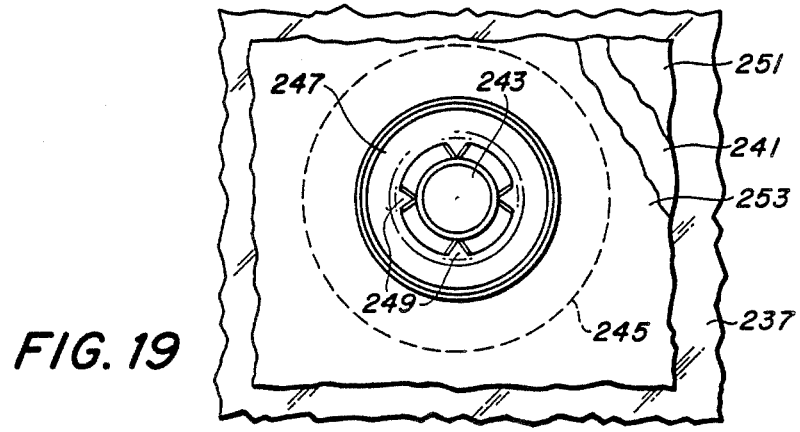
FIG. 19 is a face view of the structure shown in FIG. 18, viewed in the direction of the arrows 19—19 of FIG. 18.

FIGS. 13 and 14 relate to an embodiment useful when the most rapid intake of heat from solar rays is desired. A thin box-like structure is provided, having a rear wall 201, a transparent front wall 203, and marginal walls 205 connecting the front and rear walls and completing the enclosure. Baffles 207 in the space between the front and rear walls extend inward alternately from the right and left side walls, to force any circulating air to follow a sinuous path. There is an exit slot 209 in the rear wall near the top. The front face of the rear wall is black, for maximum heat absorption, and the exposed surfaces of the baffles are also black, as are the inner exposed faces of the side and top walls 205.

Near the bottom of the rear wall 201 is an inlet opening 211. A small fan or impeller 213 is located in this inlet opening, and is driven by a small electric motor 215 mounted on a spider-like support 217 in the space between the front and rear walls 201, 203. The motor is powered by a solar cell 219 mounted on the front or outer face of the spider 217, just behind the transparent front wall 203 of the structure, so that it receives sunlight to activate the cell to power the motor to drive the fan.

In use, this structure is placed just inside a window on the sunny side of a room which it is desired to heat as quickly as possible by solar radiation. The sun shining on the black surface of the rear wall 201 of the structure will heat this rear wall, and also the exposed black surfaces of the baffles and side walls. Rather than relying merely on slower convection currents to transfer this heat to the room atmosphere, the fan 213 sucks air from the room into the bottom of the chamber formed between the walls 201 and 203, and forces this air to travel a sinuous path determined by the baffles 207, picking up heat from the heated rear wall 201, and exiting into the room atmosphere through the exit slot 209. This provides for relatively efficient heat transfer. The fan could, of course, be powered by batteries, or by ordinary electric line current, instead of a solar cell.

Another embodiment of the invention will now be described with reference to FIGS. 15-19. This embodiment is similar in principle to the embodiment illustrated in FIGS. 6 and 7, but differs therefrom in some details.

A wall 231 of a building contains a window opening closed by a window of any desired form, here illustrated as conventional double hung sliding sash with a lower sash member 233 and an upper sash member 235. However, this form of the invention is equally applicable to a fixed window, or a hinged casement window or a window of any other desired construction. The sash window as here illustrated has the usual top, bottom, and side members defining an opening which is closed by a transparent glazing member 237 of glass or rigid plastic. This may be a single large pane or a series of small panes or "lights," if desired.

There is a panel member or gate member 241 of the same material as the panel 87 described in connection with FIGS. 6 and 7. It functions the same way as the panel 87, but is held in place differently.

About midway of the height of the panel there are two holes through the thickness of the panel 241, through which holes the shanks of two suction cup holding devices extend. These holding devices are preferably of the form shown in FIGS. 18 and 19. There is a shank 243 firmly fastened at one end to a suction cup 245 of any conventional construction, e.g., rubber. The holes in the panel 241 for receiving the shanks 243 are placed sufficiently far in from the side edges of the panel so that the suction cups 245 will clear the wooden side members of the sash 233 and will engage directly with the glazing member 237.

On the inner end of the shank 243 (the end that protrudes into the room) there is a retaining device to retain the panel 241 in position on the shank. Preferably the retaining device is formed to be frictionally retained in various positions along the length or axis of the shank. This is conveniently accomplished by using the toothed portion 247 of a conventional grommet with the teeth 249 thereof engaging resiliently with the shank 243. If the shank is made of a piece of a wooden dowel, and a grommet of the right size is used, the teeth 249 on the grommet part will engage the wooden shank with enough pressure to hold the grommet part 247 frictionally in the desired location, to retain the panel 241 with its lateral edges tight against the side rail members of the sash 233, so long as the panel 241 is in its flat or plane condition.

Grommets, as customarily available on the market, are supplied in two parts, one a plain untoothed ring, and the other a ring with teeth. In the conventional use of a grommet to reinforce a hole in a piece of fabric, the untoothed ring is placed on one side of the fabric around the hole to be reinforced, the toothed ring is placed on the other side of the fabric around the hole with the teeth extending through the hole and through the untoothed ring, and then the teeth are bent over tightly against the untoothed ring, to clamp the two rings together with the fabric between them. For purposes of the present invention, only the toothed ring of the conventional pair of grommet rings is used, and if the toothed rings can not be procured separately, then then the unneeded untoothed rings are simply discarded.

This form of fastening device for holding the panel 241 in place on the window makes it very practical and cost-effective to offer this embodiment of the invention in kit form. A kit can be marketed, consisting of a panel 241 of appropriate size for common sizes of windows, and two suction cups 245 with attached shanks 243, and two retainers 247, 249. If holes for the shanks are not pre-formed in the panel, the purchaser can easily bore the necessary holes. After inserting the suction cup shanks 243 through the holes in the panel, with the suction cups 245 on the outdoors side or black side of the panel, the panel is placed against the window with the edges of the panel tight against the wooden side rails and top and bottom rails of the window sash, and the shanks 243 are pressed firmly toward the window, to activate the suction cups 245 and cause them to be firmly attached to the window pane 237. The retainers 247, 249 are pressed firmly on the shanks, against the inner or room-side face of the panel, to hold the panel (in its flat or plane condition) tightly against the sash. The lengths of the shanks 243 is sufficient to accommodate varying designs of window sash, where the inner or room-side surfaces of the sash may be at different distances from the inner face of the glazing.

As already explained in connection with the description of the corresponding panel 87 in FIGS. 6 and 7, the outer face of the panel (conveniently having a foil covering 251, FIG. 18) is black, for maximum heat absorption, and the inner face (conveniently having a foil covering 253) is of any desired color or decoration, appropriate for the decor of the room. When the heat of the sun's rays falls on the black outer face of the panel, heat is absorbed and the panel curves from the flat or plane condition shown in FIG. 15 to the solar-responsive curved condition shown in FIG. 16, thus opening the top and bottom edges (and also somewhat the side edges) of the heat chamber formed between the panel 241 and the glazing 237, so that air from the room will enter at the bottom of the chamber, as shown by the arrow 255 in FIG. 16, will rise through the chamber while being heated by the sun, and will exit back into the room from the top of the heating chamber as shown by the arrows 257. Thus the room is appreciably heated. At night, when the sun's rays do not fall on the panel and when it is colder outside, the panel will straighten from the curved condition of FIG. 16 back to the plane condition of FIG. 15, thus closing the chamber formed between the panel and the glazing, so that the air of the room does not circulate against the now cool glazing of the window, and the room heat loss which would otherwise occur is prevented.

When it is desired to clean the window pane, the retaining members 247, 249 frictionally held on the shanks 243, are pulled off of the shanks by applying enough force to overcome the friction. Then the panel can be removed from the shanks, and the suction cups can be pried loose from the pane or glazing.

What is claimed is:

1. A solar heating structure for disposition wholly within the exterior wall glazing of a building comprising means forming a heating chamber one wall of which is adjacent a room space and is blackened for heating air within said chamber by solar radiation, and means responsive to solar radiation for controlling flow of air from said room space through said heating chamber, said structure comprising:
  a. said means responsive to solar radiation comprising a panel member having a blackened surface positioned to have solar radiation impinge thereon and to change its shape in response to heating of such surface by impingement of solar radiation thereon; and
  b. said panel member having a substantially plane shape closing said chamber when said panel member is relatively cool, and having a curved shape opening a passage between said chamber and said room space when said blackened surface of said panel member is heated by impingement of solar radiation thereon.

2. A structure as defined in claim 1, wherein said panel member is mounted adjacent to a window having a transparent glazing therein and is so positioned that solar radiation may pass through said glazing and impinge on said blackened surface of said panel, said chamber being between said glazing and said panel.

3. A structure as defined in claim 2, wherein said panel is detachably mounted on said window.

4. A structure as defined in claim 2, further comprising suction cup means for detachably mounting said panel on said window.

5. A structure as defined in claim 2, further comprising a plurality of suction cups engaging and held to said glazing of said window, each suction cup having a shank passing through said panel member, and means detachably holding said panel member on said shanks.

6. A structure as defined in claim 1, wherein said panel member is composed mainly of foamed low density urethane.

7. A structure as defined in claim 1, wherein said panel member is composed mainly of low density foamed urethane reinforced with fiber glass and having aluminum foil permanently bonded to both faces of the panel.

8. A kit of parts for application to a window of a room to enhance heating of the room by solar radiation and to reduce heat loss from the room during absence of solar radiation, said kit comprising a panel for application to a window portion to cover substantially the entire area of the room face of said window portion, and fastening means for fastening said panel to said window portion at intermediate locations approximately midway between top and bottom edges of said panel when applied to said window portion, said panel having a black face toward said window portion to absorb heat from solar radiation coming through said window portion and impinging on said panel, said panel being of material which is of substantially flat planar shape when opposite faces of said panel are at equal temperatures and which will assume a curved shape when said black face thereof is heated by solar radiation to a temperature hotter than the temperature of the opposite face thereof, so that bottom and top edges of said panel will move away from said window portion to provide respective air inlet and outlet openings for an air chamber between said panel and said window portion to which it is attached.

9. A kit as defined in claim 8, wherein said fastening means comprises suction cups for mounting on said window, and detachable means for supporting said panel from said suction cups.

10. A kit as defined in claim 8, wherein said panel is formed at least mainly from foamed low density urethane.

* * * * *